United States Patent [19]
Sakakura et al.

[11] Patent Number: 5,625,795
[45] Date of Patent: Apr. 29, 1997

[54] EXCLUSIVE CONTROL UNIT FOR A RESOURCE SHARED AMONG COMPUTERS

[75] Inventors: Takashi Sakakura; Jose Uemura, both of Kamakura, Japan

[73] Assignee: Mitsubishi Denki Kabushiki Kaisha, Tokyo, Japan

[21] Appl. No.: 433,145

[22] Filed: May 3, 1995

[30] Foreign Application Priority Data

May 13, 1994 [JP] Japan ..................... 6-099746

[51] Int. Cl.$^6$ ..................... G06F 13/00
[52] U.S. Cl. ............... 395/475; 395/200.03; 395/200.08; 395/474; 395/481; 364/DIG. 1
[58] Field of Search ............... 395/200.03, 200.08, 395/474, 475, 481

[56] References Cited

U.S. PATENT DOCUMENTS

| | | | |
|---|---|---|---|
| 4,403,286 | 9/1983 | Fry et al. | 395/650 |
| 5,202,887 | 4/1993 | Ueno et al. | 371/10.1 |
| 5,295,133 | 3/1994 | Jurkevich | 370/16 |
| 5,377,324 | 12/1994 | Kabemoto et al. | 395/474 |
| 5,390,316 | 2/1995 | Cramer et al. | 395/474 |
| 5,437,031 | 7/1995 | Kitami | 395/650 |
| 5,437,047 | 7/1995 | Nakamura | 395/200.03 |
| 5,469,549 | 11/1995 | Simpson et al. | 395/200.08 |

FOREIGN PATENT DOCUMENTS 63-148365 6/1988 Japan.
4-364514 12/1992 Japan.

*Primary Examiner*—Frank J. Asta
*Attorney, Agent, or Firm*—Wolf, Greenfield & Sacks, P.C.

[57] ABSTRACT

The invention provides an exclusive control unit among computers which can reliably perform an exclusive control for a shared resource while keeping a system running as a whole even if a problem occurs in any of the computers in the system. Each of the computers is connected to the others through a LAN and to a distributed shared memory bus for connecting each distributed shared memory card mounted on each computer with the others. The distributed shared memory card has a distributed shared memory, which shares the shared resource with the other distributed shared memories, and a distributed shared memory controller which is connected with the distributed shared memory bus for making it possible to exchange data among the distributed shared memories mounted on the computers, an I/O bus inside its own computer, and its distributed shared memory, through its internal bus, and the distributed shared memory card performs an exclusive control for the shared data which is shared among the respective computers and exchanged among them through the distributed shared memory bus.

12 Claims, 6 Drawing Sheets

|  | 502 | 503 |
|---|---|---|
| | BLOCK NUMBER IN DATABASE | DSM ADDRESS |
| 501 | 0 | 0 |
| | 1 | 1 |
| | ■ | |
| | 1022 | 1022 |
| | 1023 | 1023 |

EXCLUSIVE CONTROL UNIT FOR A RESOURCE SHARED AMONG COMPUTERS

BACKGROUND OF THE INVENTION

1. Field of the Invention

The invention relates to an exclusive control unit and particularly to an exclusive control unit for performing an exclusive control to be performed among a plurality of computers For a shared resource, for example, a database stored in a disk unit and the like shared among a plurality of computers.

2. Description of the Related Art

In recent years, with downsizing of computers, technologies for operating a database with increased security, at a higher speed, and at a higher net working rate on computers called workstations, have been developed. As an approach for solving these problems in database services, Oracle Inc. has provided a product called Parallel Server. This is a database program to be run on a plurality of computers linked to one another on a network, and the database program is run in parallel on the respective computers in relation to the same database shared among the plurality of computers.

This program has improved a database service in response speed and furthermore in net working rate, by means of parallel running, since the database service is maintained even if a failure happens in any of the computers running on the same database by the database program being run on other computers that are not suffering from problems.

In the case of running a plurality of database programs for the same database shared among a plurality of computers, an exclusive control is needed in order to avoid a simultaneous update operation to the same data. Oracle Inc. or another system vendor such as Pyramid Inc. has implemented and provided such an exclusive control mechanism in the shape of software for performing data exchange through a network. However, such an implementing method by means of software is liable to be affected in its performance by such factors as network traffic, average load on computers, and the like, and its cost for the exclusive control is a considerable burden to the overall performance of the database system.

As mentioned above, an exclusive control is needed among a plurality of computers running on the same database, and in the case of implementing an exclusive control mechanism by means of software, its performance becomes a problem.

By the way, an exclusive control when a resource is shared among a plurality of computers can be performed not only by software, but also hardware. For example, Japanese Patent Application Laid-Open 364514-1992 discloses a case in which each of a plurality of computers composing a multi-host system accesses a device on a Small Computer Systems Interface (SCSI) bus composed for the multi-host system. The SCSI protocol primarily has a specification to make it possible to connect a plurality of computers with one another and its exclusive control is performed by inputting SCSI commands called Reserve and Release, which are inserted between other commands for accessing data.

The Japanese Patent Application Laid-Open 364514-1992 discloses that an exclusive controller provided in parallel with a SCSI bus solves a cost problem of the Reserve and Release and a problem that states of computers for exclusive control of the computers in a multi-host system become contradictory to one another when a reset operation is performed by either of target controllers after some host computer has issued a Reserve command, since the SCSI specification gives freedom of resetting the bus to each of its target controllers.

Further, Japanese Patent Application Laid-Open 148365-1988 discloses a method for performing an exclusive control for data stored in a disk shared between two computers by operating on the data in a shared memory disposed between the two computers. However, in an exclusive control mechanism of the prior art by means of software and data exchange using a network which is generally adopted in the case that an exclusive control is needed among a plurality of computers, its performance often becomes a problem.

Also, in an exclusive control mechanism of the prior art by means of data on a shared memory of a shared memory unit disposed between computers, there is a problem that an exclusive control process cannot be maintained in a case where a problem occurs in the shared memory.

Further, since the shared memory unit is provided to a system as a dedicated hardware component, there is a problem that the cost of the system becomes expensive. This problem is the reason why an exclusive control system by means of software and data exchange through a network is often used in spite of its performance problem.

In a method using one shared memory, in which an exclusive control is needed, there is also a problem that an increase in the number of trials for acquiring an occupancy right for occupying a resource, which is caused by an increase in the number of computers sharing the resource, becomes a great burden to the system performance.

Another problem to be solved by the invention is to secure a communication path among computers. For example, in the case of composing a multiplexing system by means of personal computers, a multiplex communication path of high reliability is needed to prevent a single-point failure on the communication path.

SUMMARY OF THE INVENTION

The invention has been made in order to solve the above-mentioned problems, and an object of the invention is to provide an exclusive control unit among computers which is able to reliably perform an exclusive control for a shared resource while keeping a system running as a whole even if a problem occurs in any of the computers in the system.

To attain the above-mentioned object, the invention provides an exclusive control unit among computers for performing an exclusive control for a shared resource shared among the plurality of computers connected with one another through a network, comprising distributed shared memories, each of which is respectively mounted on each of the computers and shares the shared resource, a distributed shared memory bus connecting the distributed shared memories with one another so that they may exchange data among them, and a controller for controlling the distributed shared memories and the distributed shared memory bus, wherein update of either of the distributed shared memories is reflected in the other distributed shared memories.

Another embodiment of the invention provides an exclusive control unit among computers as which has a processor which is connected with the controller and performs an exclusive control for the shared resource.

Another embodiment of the invention provides an exclusive control unit among computers as defined in the above inventions, which has means for providing a communication function for making the computers communicate with one another through the distributed shared memory bus and utilizes the distributed shared memory bus as a communication path.

Another embodiment of the invention provides an exclusive control unit among computers as defined in the above inventions, wherein the distributed shared memory bus has a signal line for transmitting information for identifying each of the computers.

According to the invention, the controller secures the distributed shared memory bus when a write operation is made to a distributed shared memory of either of the computers. Each of the controllers of the other computers takes data on the distributed shared memory bus and rewrites the data on the distributed shared memory of its own computer to reflect the above-mentioned write operation. After this, the controller of the computer which has written the data releases the distributed shared memory bus. In this manner, an exclusive control is made at a high speed and since each of the computers keeps the shared resource in its own distributed shared memory, an exclusive control can be maintained by the other computers even if a problem occurs in any of the computers.

According to another embodiment of the invention, since a write operation to its distributed shared memory can be performed by a processor connected with each controller, it is possible to reduce the load on the processor of each computer, even if a number of write retry operations are repeated due to failure in securing the distributed shared memory bus.

According to another embodiment of the invention, since the distributed shared memory bus is provide with not only an exclusive control function but also a communication function, is possible to temporarily utilize the distributed shared memory bus as a communication path even in a case where the network service is stopped.

According to another embodiment of the invention, since the distributed shared memory bus is made so as to transmit information for identifying each of the computers, it is possible to make an adjustment among the computers which is liable to be needed when starting up the operating system to run on the computers without using the network.

PREFERRED EMBODIMENTS OF THE INVENTION

Preferred embodiments of the invention will now be described with reference to the drawings.
(First embodiment)

Figure 1:
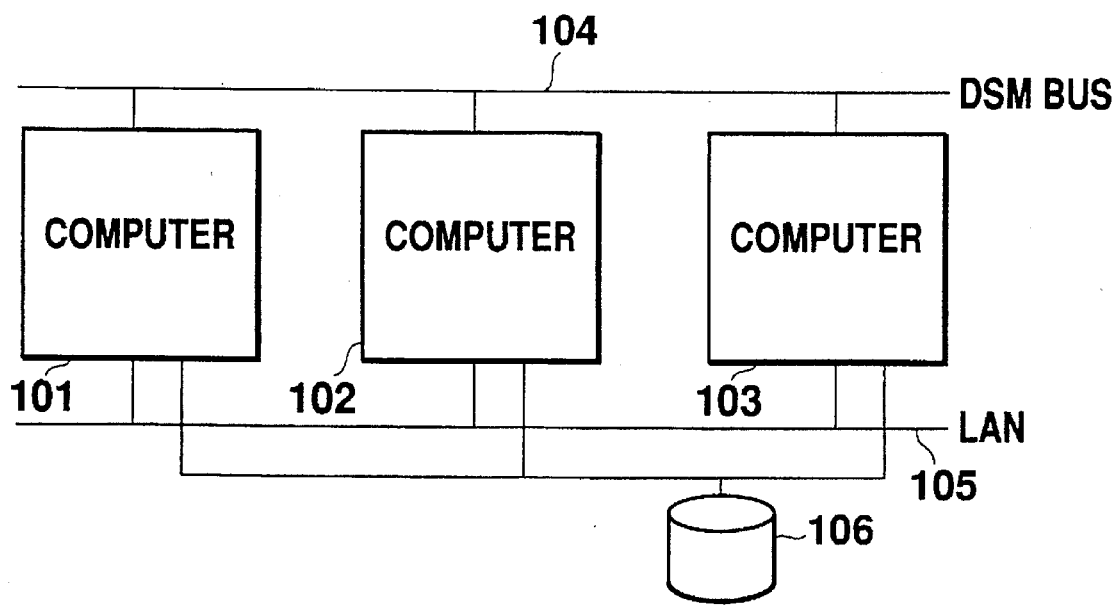
FIG. 1 shows a configuration of a computer system to which an exclusive control unit among computers of the first embodiment of the invention is applied.

FIG. 1 shows the configuration of a computer system to which an exclusive control unit among computers of a first embodiment of the invention is applied. Such computers 101, 102, and 103 as personal computers are connected with a LAN 105 and a distributed shared memory bus 104 which is connected with each of distributed shared memory cards characterizing this embodiment. The computers 101, 102, and 103 share a disk 106 with one another which can be freely accessed by each of the computers 101, 102, and 103.

Figure 2:
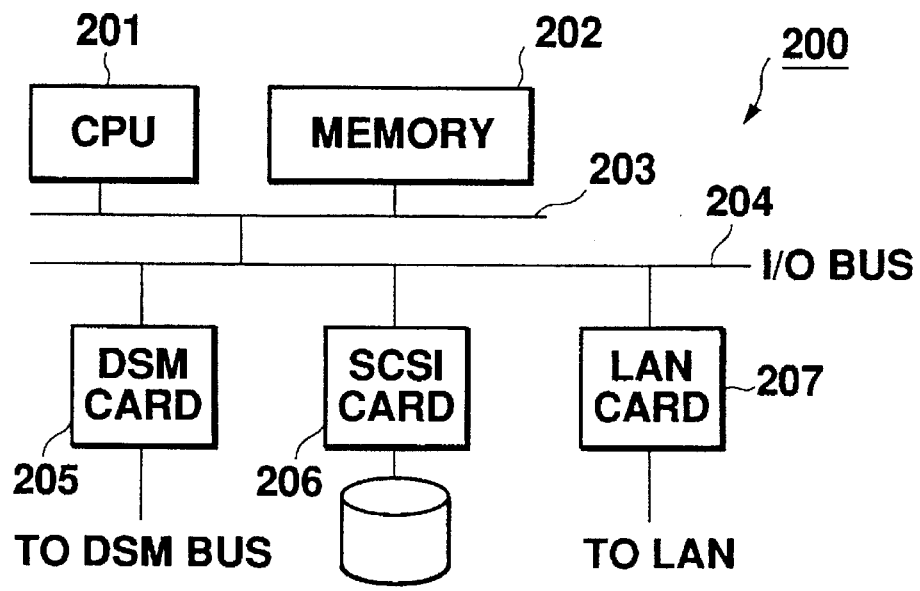
FIG. 2 is a block diagram of each of the computers in FIG. 1.

FIG. 2 is a block diagram of each of the computers in FIG. 1, and a computer 200 is equivalent to each of the computers 101, 102, and 103 shown in FIG. 1. In FIG. 2, a memory bus 203 connected with a memory 202 and a CPU 201 are connected with an I/O bus 204 inside the computer 200. The I/O bus 204 is connected with such input/output interface devices as a distributed shared memory card 205 For connecting to the distributed shared memory bus 104 in FIG. 1, a SCSI card 206 for connecting to the disk 106, and a LAN card 207 for connecting to the LAN.

Figure 3:
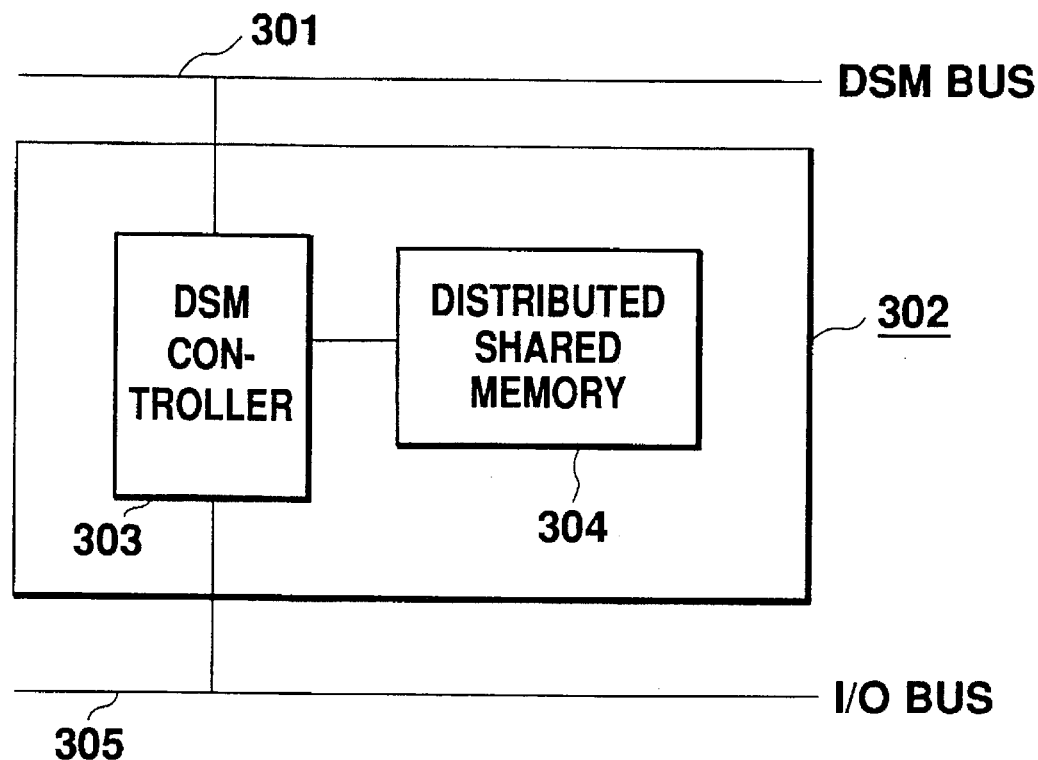
FIG. 3 is a block diagram of a distributed shared memory card in the first embodiment.

FIG. 3 is a block diagram of a distributed shared memory card, and the distributed shared memory card 802 is equivalent to the distributed shared memory card 205 shown in FIG. 2. The distributed shared memory card has a distributed shared memory 304, which shares the shared resource with the other distributed shared memories, and a distributed shared memory controller 303 which is connected with a distributed shared memory bus 301, making it possible to exchange data among the distributed shared memories 304 mounted on the computers and an I/O bus 805 inside its own computer which is equivalent to the I/O bus 204 in FIG. 2, and is connected with its distributed shared memory through its internal bus. This distributed shared memory controller 303 controls the distributed shared memory and the distributed shared memory bus.

Figure 4:
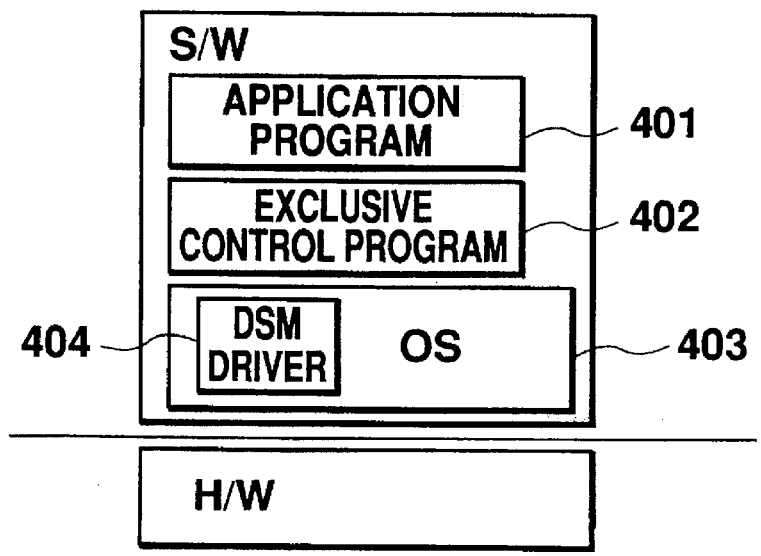
FIG. 4 is a software composition diagram of programs to be installed in the computer shown in FIG. 2.

FIG. 4 is a software composition diagram of programs to be installed in the computer 200 shown in FIG. 2, which includes an application program 401, utilizing such a shared resource as a database shared among a plurality of computers, and an exclusive control program 402 for carrying out exclusive control for the shared resource. The exclusive control program 402 accesses the operating system 403 through a system call interface and requests a distributed shared memory driver 404 to read from or write into the distributed shared memory 304 through the operating system 403. This embodiment adopts UNIX as the operating system 403. The application program 401 in this embodiment is a database program. The exclusive control program 402 is also a program suitable for a database. Each of these programs is run as a software running means by the CPU 201.

Figures 5, 6:
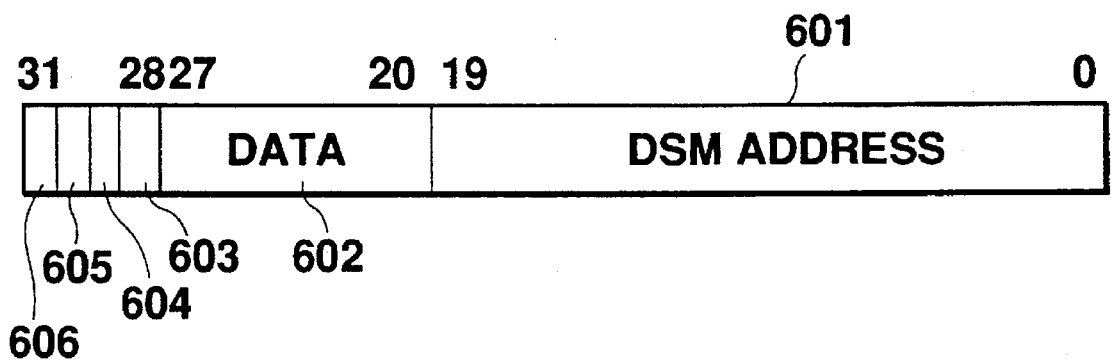
FIG. 5 is a diagram showing the same shared resource management table which an exclusive control program on each computer shown in FIG. 2 has.
FIG. 6 is a diagram showing content of a register of the distributed shared memory card in the first embodiment.

FIG. 5 is a diagram showing the same shared resource management table which an exclusive control program 402 on each of the computers 101, 102, and 103 has. In FIG. 5, block number 502 of the database and address number 503 on the distributed shared memory corresponding to the block number 502 are respectively stored in the left and right columns of the shared resource management table 501. In this example, a lock data area of 1 byte is allocated to one block on the distributed shared memory. Supposing that a block size of the database in this embodiment is 2 KB, since this shared resource management table 501 can manage 1024 blocks, this table can manage a database of 2 MB. It is a matter of course that the number and size of blocks to be managed are not limited to this. A system operation in this embodiment is described in the following.

Now, it is assumed that a write request has been generated to a data block with block number 1 on the management table in the application program 401. The application program 401 calls a lock acquisition request program of the exclusive control program 402, using a block number of the data block to which a write is intend to be made as a parameter, before issuing a write request to the operating system 403. The lock acquisition request becomes an exclusive control request of an address corresponding to the data block on the distributed shared memory 304. Since this embodiment adopts a simple lock method, a write operation and a read operation are not distinguished from each other in the exclusive control.

The exclusive control program 402 finds an address on the distributed shared memory from a block number delivered from the application program 401 and the management table, when it has received an exclusive control request from the application program 401. The exclusive control program 402 immediately calls the distributed shared memory driver 404 through an ioctl interface of the operating system 403 by means of an exclusive write command on the basis of the data to be written and the address on the distributed shared memory. In this case, the data to be written is a machine ID, which is an identification number specifically assigned to each computer. The ioctl interface is described in detail later.

The distributed shared memory driver 404 acquires the machine ID and the address on the distributed shared memory with the exclusive write command from the exclusive control program 402 through the operating system 403. FIG. 6 shows the content of a register of the distributed shared memory card 205 mapped on the I/O space, and the distributed shared memory driver 404 writes control data into the register shown in FIG. 6 and operates the distributed shared memory card 205. In FIG. 6, the register is composed of command bit areas 603 to 606, a data area 602 where the data for a read or write operation is stored, and an address area 601 where an address to be accessed on the distributed shared memory 304 is stored. The above-mentioned command bit areas 603 to 606 are composed of a status bit 606 showing a state of the distributed shared memory 304, a secure instruction bit 605 to be turned on when attempting to secure the distributed shared memory bus 301, a bus release instruction bit 604 to be turned on when attempting to release the secured distributed shared memory bus 301, and a read/write instruction bit 603 which indicates a read instruction with 0 and a write instruction with 1 when both of the bus secure instruction bit 605 and the bus release instruction bit 604 are off. In this embodiment, the size of the distributed shared memory bus 301 is 1 MB.

The distributed shared memory driver 404 turns on the bus secure instruction bit 605 of the register and checks the status bit 606 when it has received an exclusive write instruction from the exclusive control program 402. In case of failing to secure the bus, the bus securing operation is retried until it succeeds in securing the bus. After securing the bus, the memory driver 404 sets a read instruction and the address, and reads the data. The read data is saved.

At this time, when the content of the read data is −1, namely, a location of the address specified on the distributed shared memory 804 is unused, the address is determined to be usable. Therefore, the memory driver 404 sets the machine ID received from the exclusive control program 402 into the data area 602 as data and sets a write instruction. After setting them, it releases the bus by turning on the bus release instruction bit 604.

On the other hand, when the content of the read data is not −1, namely, a location of the specified address is in use, the space not usable, and so the memory driver 404 immediately releases the bus without doing anything. In this manner, this machine ID is written on the applicable addresses on all the distributed shared memories 304. After this, the read data which has been saved is returned to the exclusive control program 402 through the ioctl interface.

Differing from such a software operation as this, the distributed shared memory card 302 operates in the following manner.

If a bus arbitration (BA) signal on the distributed shared memory bus 301 has been already asserted when the distributed shared memory card 802 receives a bus secure instruction, it is judged that the bus has been already occupied by another computer and an error that the bus could not be secured is reported by setting the status bit 606 to 1. When the BA signal is in a negate state, the status bit 606 is set to 0 after asserting the BA signal, and it is reported that the bus has been successfully secured. The BA signal is kept asserted until a bus release instruction is issued by the software after that. However, if a reset (RST) signal is sent to the distributed shared memory bus 301 by a write operation to the status bit, the BA signal is brought in a negate state and the bus is released. A write instruction is given by data of 1 byte expressed by a data (DATA) signal 704 on the distributed shared memory bus 801 and an address expressed by an address (ADDR) signal 703, but each distributed shared memory card 302 connected with the distributed shared memory bus 301 monitors a read/write (R/W) signal and when an assert state, namely, a write instruction is found, each computer rewrites data in its own distributed shared memory 304 with the data on the distributed shared memory bus 301.

Figure 7:
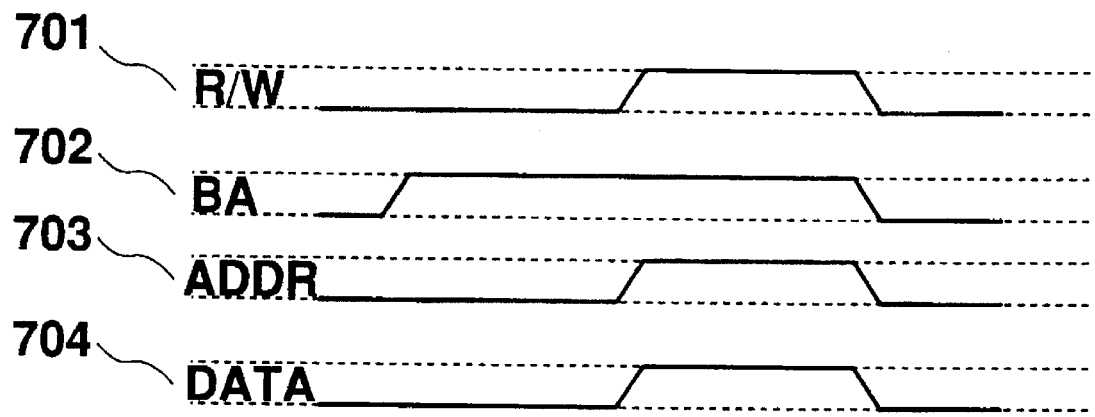
FIG. 7 is a timing chart showing operation timing of the distributed shared memory bus when making a read/write operation after securing the bus in the first embodiment.
Figure 8:
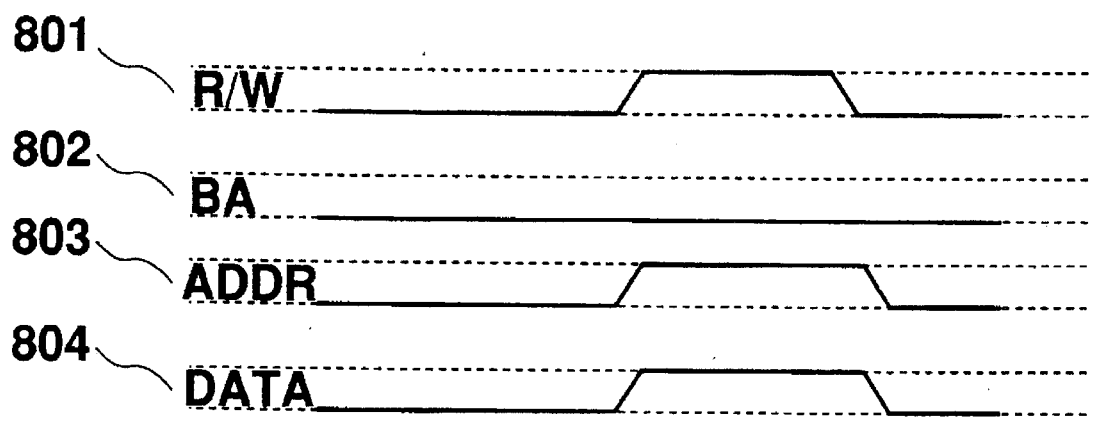
FIG. 8 is a timing chart showing operation timing of the distributed shared memory bus 301 when making a write operation without securing the bus in the first embodiment.

As mentioned above, by such an update request as a write request to either of the distributed shared memories, each distributed shared memory connected with the distributed shared memory bus 301 is rewritten with the data on the distributed shared memory bus 301 and the update is reflected in each distributed shared memory. FIG. 7 shows operation timing of the distributed shared memory bus 301 when performing a read/write operation after securing the bus, and FIG. 8 shows operation timing of the distributed shared memory bus 301 when performing a read/write operation without securing the bus. In FIGS. 7 and 8, R/W signals 701 and 801 show signals to be asserted in a write operation, and BA signals 702 and 802 are signals showing that the bus is occupied when they are asserted.

The exclusive control program 402 judges that a lock acquisition of the applicable address on the distributed shared memory 304 has been successfully performed and returns the control to the application program 401, in a case where a return value showing a result of execution For an access request by an exclusive write command to the distributed shared memory 304 from the distributed shared memory driver 404 is −1. According to this, the application program 401 starts a write operation to a data block. When the return value is not −1, the application program repeatedly retries the operation until it succeeds.

The application program 401 calls a lock release program with the same address as a lock acquisition of the applicable address on the distributed shared memory 304, namely, with a block number of the data block, when a write operation to the data block is finished. The exclusive control program 402 calls the distributed shared memory driver 404 by means of a write command with the applicable address and the data −1 showing an unused state through the ioctl interface in the same way as a lock acquisition. The distributed shared memory driver 404 sets −1 in the data area 602 of the register and sets a specified address in the address area 601, and sets the read/write bit 603 to ON. In this manner, the distributed shared memory driver 404 puts the applicable address in an unused state by writing −1 into the applicable address on the distributed shared memory 304, and the secured lock is released.

As mentioned above, an exclusive control for a shared resource is performed in a computer system composed of a plurality of computers.

By the way, initialization of the distributed shared memory 304 is performed by calling the initialization routine of the distributed shared memory driver 404 when starting the operating system, and the contents of the distributed shared memory 304 is initialized into −1, which is the data showing an unused state. In this initialization, an adjustment is made so that the other computers may be in an active state. A write operation of −1 into the distributed shared memory 304 is performed by one of the computers composing a cluster in the computer system. In this embodiment, a computer is fixed as a master, and a method in which the master computer receives a message of ready from the other computers is adopted. In this embodiment, therefore, a computer not registered as a cluster in the computer system cannot participate during an exclusive control session.

Further, if any of the computers constituting a cluster goes down during operation of the cluster, it is necessary to clear all the contents of the distributed shared memory 304 maintained by the down computer to put it into an unused state. This is performed in the following manner. Namely, the application programs 401 on the still running computers are notified that a computer has gone down. The application programs 401 which have received the notification determine a computer to perform a post process through communication with one another. The application program 401 on the computer determined to perform the post process calls a lock release routine of the exclusive control program 402, with a machine ID of the down computer as a parameter. The exclusive control program 402 reads all addresses managed by the shared resource management table through the ioctl interface by means of a read command, and writes −1 into the distributed shared memory 304 by means of a write command when the read address matches with the machine ID of the down computer and clears the contents of the distributed shared memory 304 secured by the down computer to put it into an unused state. In this manner, a lock release process of contents of the distributed shared memory 304 secured by the down computer is performed. Thus, an exclusive control process can be continued for the already secured data.

As mentioned above, according to this embodiment, an exclusive control for a shared resource in a cluster composed of plural computers can be performed at a high speed while keeping the system inexpensive in cost by mounting the same standardized card on each of the computers.
(Second embodiment)

A second embodiment of the invention is described in the following. A computer system, and each computer in it, to which an exclusive control unit among computers of this embodiment is applied are respectively composed as shown in FIGS. 1 and 2 in the same way as the first embodiment.

A software composition of this embodiment is the same as the first embodiment as shown in FIG. 4. Namely, an application program 401 is assumed to be a database program. The application program 401 accesses a database on a shared disk, and an exclusive control program 402 performs an exclusive control for data on the database in data blocks of the database.

Figure 9:
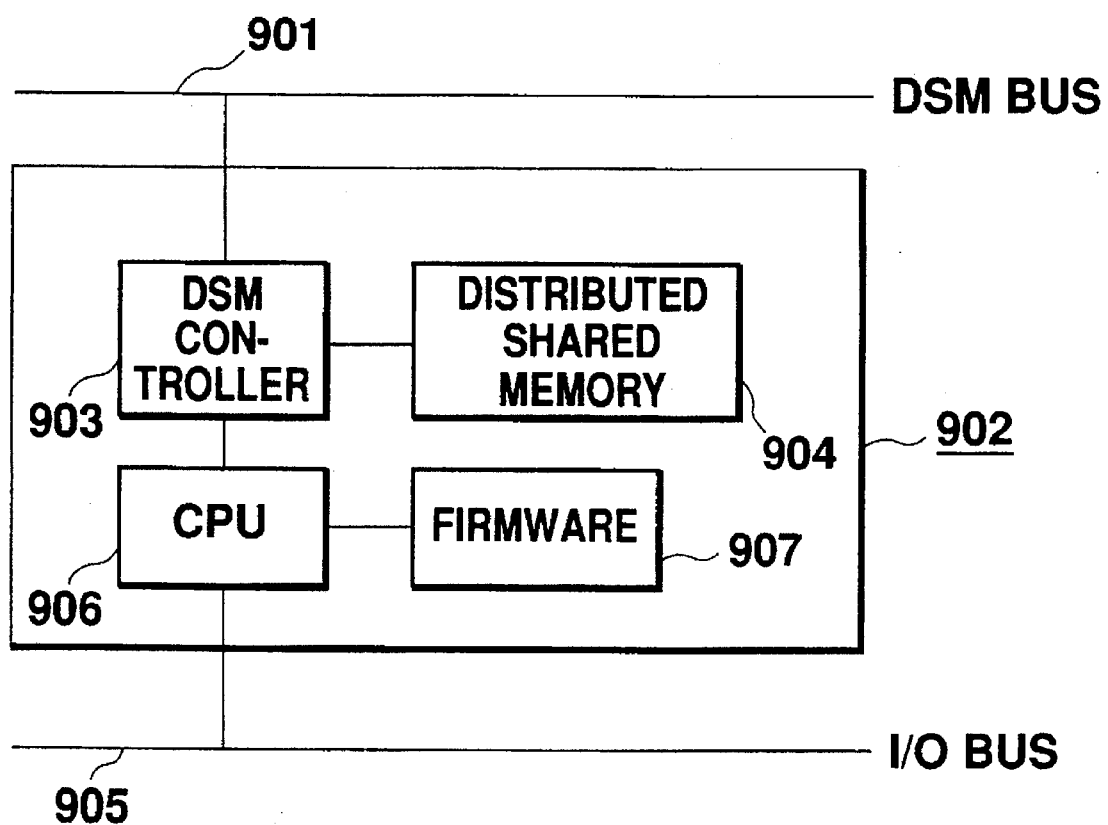
FIG. 9 is a block diagram of a distributed shared memory card in the second embodiment.

FIG. 9 is a block diagram of a distributed shared memory card of this embodiment, and the distributed shared memory card 902 is equivalent to the distributed shared memory card 205 shown in FIG. 2. The distributed shared memory card 902 has a distributed shared memory controller 903 and a distributed shared memory 904 which are almost the same as the first embodiment.

What characterizes this embodiment is that the distributed shared memory card 902 is provided with a processor (CPU) 906. As shown in the above-mentioned first embodiment, for example, in the case of performing an exclusive control for a shared resource by means of a simple lock method utilizing a simple distributed shared memory, each computer consumes a longer CPU time to acquire a lock when competition for a shared resource is keen. Therefore, this embodiment can reduce the load on the CPU 201 of the computer 200 by providing the distributed shared memory card 902 with a CPU 906 which performs an exclusive control for a shared resource, and allows the distributed shared memory card 902 to execute high-level commands.

Operation of this embodiment is described in the following.

When a write request to the same data block has occurred from the same application program 401 as the first embodiment, the program 401 calls a lock acquisition request routine of the exclusive control program 402. Since this embodiment also adopts a simple lock method, write and read ace not distinguished from each other in relation to the exclusive control. The exclusive control program 402 finds an address on the distributed shared memory from a block number delivered from the application program 401 and the shared resource management table kept by the exclusive control program 402 when it has received an exclusive control request from the application program 401. The exclusive control program 402 issues a lock acquisition request for an address corresponding to the data block on the distributed shared memory 904 by calling the distributed shared memory driver 404 through an ioctl interface of the operating system 403 by means of an exclusive write command using the address on the distributed shared memory 904 and the data to be written as parameters. In this case, the data to be written is a machine ID of the applicable computer.

The distributed shared memory driver 404 takes the address on the distributed shared memory and the machine ID with the exclusive write command from the exclusive control program 402 through the operating system 403. By the way, this embodiment has a register having the same format as the register of the distributed shared memory card 902 in FIG. 6 used in the first embodiment. The distributed shared memory driver 404 generates an exclusive write command through setting of the data and the address into the register when receiving an exclusive write command. The exclusive write command is concretely represented by turning on both of a read/write bit 603 and an exclusive write bit assigned to the location of the bus secure instruction bit 605 shown in FIG. 6. When the exclusive write command is set, the distributed shared memory driver 404 sleeps and waits for a completion interrupt.

Figure 10:
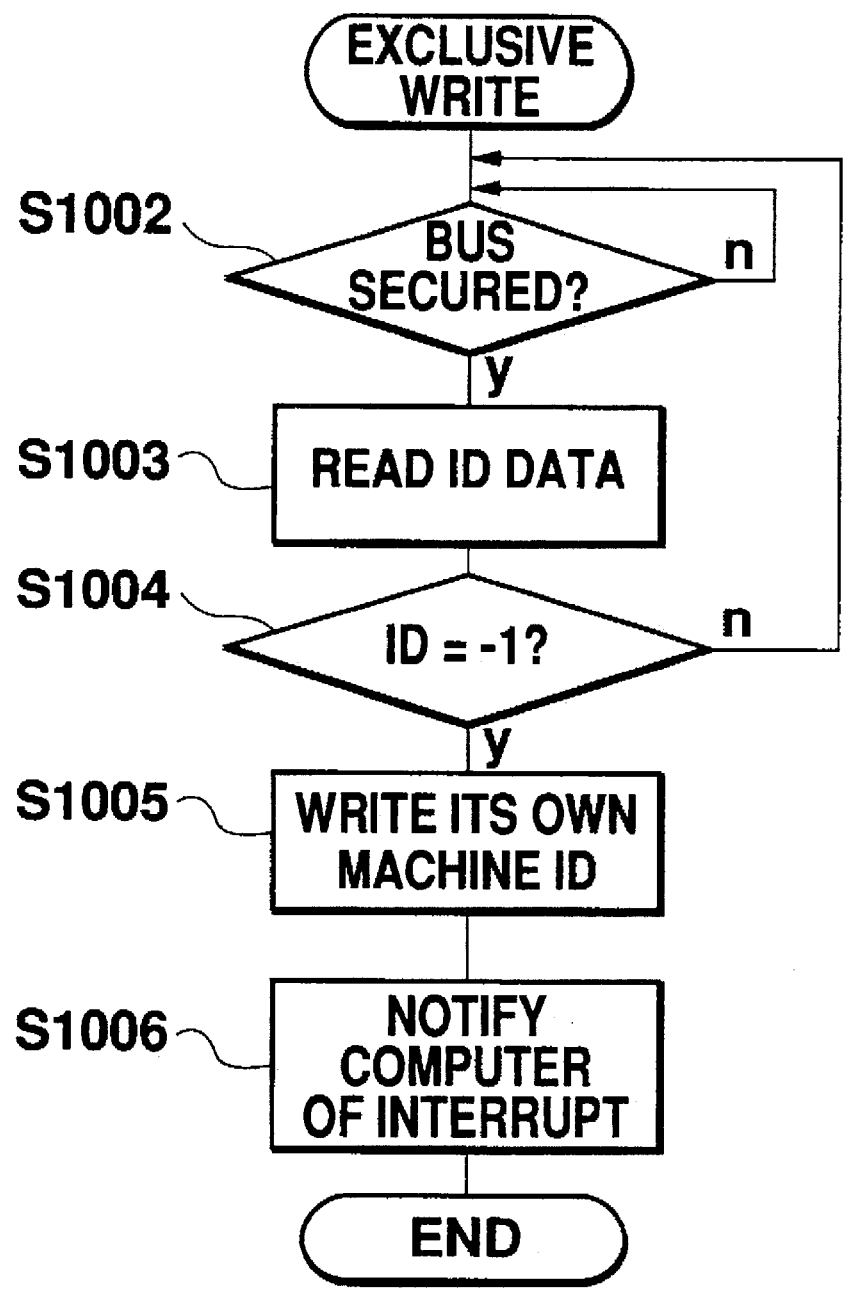
FIG. 10 is a flowchart showing an exclusive write process in the second embodiment.

When receiving an exclusive write command, the CPU 906 in the distributed shared memory card 902 performs a process by means of logic shown in FIG. 10. As clearly known from comparison of FIGS. 3 and 9, the distributed shared memory card of the second embodiment is distinguished in structure from that of the first embodiment by being provided with the processor 906 and its firmware 907 for more complex control, but both of the memory cards operate on the distributed shared memory bus 901 in exactly the same way as each other.

Referring to the flowchart shown in FIG. 10, an exclusive write process in the CFU 906 is described in the following.

First, the distributed shared memory bus 901 is secured so that the distributed shared memory card 902 may exclusively use the distributed shared memory bus 901 (Step 1002). In the case that the bus has been secured, data in the specified address is read (Step 1003). A value of the read data is the machine ID of a computer if a data block corresponding to the specified address is occupied by the computer, and is −1 representing an unused state if not occupied. If the data is not −1, the distributed shared memory bus 901 is released and the operation is repeatedly retried on Step 1002. Description of a deadlock detecting function is omitted since it is not a special character of this embodiment. When still further attempting to lock the already secured data, the process goes into an endless loop in Step 1004, if not provided with a deadlock detecting function. If the data is −1, its own machine ID is written. The write operation is reflected in each of the distributed shared memories 904 connected with the distributed shared memory bus 901 in the same way as the first embodiment (Step 1005). When the write operation is finished, the distributed shared memory bus 901 is released and the CPU 201 of the computer is notified by an interrupt that the lock acquisition is finished. The CPU 201 which has received the interrupt returns to the distributed shared memory driver 404. The distributed shared memory driver 404 reports completion of the exclusive write operation to the exclusive control program 402 through the ioctl interface. The exclusive control program 402 returns the control to the application program 401.

When the application program 401 finishes its access to the applicable data block, it calls the lock release routine of the exclusive control program 402. The exclusive control program 402 calls the write routine of the distributed shared memory driver 404 on the basis of the applicable address and the data −1 representing an unused state. The distributed shared memory driver 404 sets −1 at the data area 602 of the register, sets the specified address at the address area 601, and sets ON at the read/write bit 603. In this manner, −1 is written into the applicable address of the distributed shared memory 904, the applicable address comes to be in an unused state, and the secured lock is released.

By the way, a post process in the case that a computer goes down while keeping initialization and lock of the distributed shared memory 904, is performed by issuing a command to the distributed shared memory card 902. When the operating system 403 starts up, the initialization routine off the distributed shared memory driver 404 is called. The initialization routine turns on the initialize bit assigned to the location of the bus release instruction bit 604. As a result of this, the distributed shared memory card 902 comes to be in an active state.

The initialization routine checks whether or not the number of computers which are booted up in the cluster except its own computer is one or less, and if this is the case, ON is set at the initialize bit 604 and the read/write bit 603. Thus, the distributed shared memory 904 is initialized to −1, representing an unused state, by the CPU 906 inside the distributed shared memory card 902. Namely, since there cannot be a resource to be shared if only one computer is in an active state, it is not necessary to reflect the contents of the distributed shared memories 904 of other computers. Completion of the above-mentioned process is notified by an interrupt.

In case where two or more computers except its own computer have been already booted up in the cluster, initialization of their distributed shared memories 904 is requested. When the distributed shared memory driver 404 sends an initialization request message to a management demon of the computers already booted up, the management demon which has received the message calls a synchronization command of its own distributed shared memory driver 404. According to this, the distributed shared memory driver 404 sees all of the read/write bit 603, the initialize bit 604, and the exclusive write bit 605 to 1. Then, after the CPU 906 inside the distributed shared memory card 902 secures the distributed shared memory bus 901 it performs a read/write operation of all data inside its own distributed shared memory 904. As a result of this, the applicable data is copied into the distributed shared memories 904 on all the distributed shared memory cards 902 in an active state. Completion of this initialization is notified by an interrupt. The distributed shared memory driver 404 is informed of completion of the initialization process by the interrupt, and notifies the management demon of that fact. The management demon returns a message to the distributed shared memory driver 404 which requested the initialization. Thus, initialization of the distributed shared memory mounted on the booted-up computer is completed and the initialization routine of the distributed shared memory driver 404 ends.

This embodiment adopts a method of initialization as mentioned above, but as shown in the first embodiment, the initialization routines of the distributed shared memory drivers 404 on the computers may issue an initialization command of their own distributed shared memories all at once while keeping synchronization with one another, and a method of processing plural computers booted up later with one synchronization command may be also considered.

In the event of any of the computers in a cluster going down, the lock can be recovered, while maintaining the acquired lock, using the following method. After determining a master computer to perform a post process in the same way as the first embodiment, the lock release routine of the exclusive control program is called with the machine ID of the down computer. The exclusive control program 402 calls the distributed shared memory driver 404 by delivering the machine ID to it by means of the lock release command of the ioctl interface.

The distributed shared memory driver 404, upon receiving said command, sets ON at the initialize bit 604 and the exclusive write bit 605, and sets the applicable machine ID at the data area 602. Then, the CPU 906 reads data inside the distributed shared memories 904 and writes −1 representing an unused state if the read data matches with the applicable machine ID. The distributed shared memory driver 404 is informed of completion of the process by an interrupt and notifies the exclusive control program 402 of that fact.

The first and second embodiments are summarized and supplemented in the following. The first and second embodiments were described in the simplest form. Distributed shared memory cards mounted on computers 101, 102, and 103 are connected with one another through a distributed shared memory bus 104, and control one another by means of a BA signal and R/W signal representing read/write on the distributed shared memory bus 104.

A write operation to the distributed shared memories 304 and 904 is performed by a process where a R/W signal of a distributed shared memory bus 104 is asserted, an address (ADDR) signal of 20 bits and a data (DATA) signal of 8 bits are sent, and the distributed shared memory controllers 303 and 903 of all the distributed shared memory cards 302 and 902 connected with the distributed shared memory bus 104 write these data into the applicable address of their own distributed shared memories 304 and 904.

A read operation from the distributed shared memories 304 and 904 is performed from their own distributed shared memories 304 and 904 possessed by the respective computers, but when a BA signal is asserted by another distributed shared memory card 902 on the distributed shared memory bus 104, a write operation cannot be performed.

Securing a BA signal to carry out a read operation can be performed at any time if the BA signal is not asserted by other distributed shared memory cards 302 and 902. It is performed by commands which a user enters through registers into the distributed shared memory controllers 303 and 903 to secure and release a BA signal and carry out a read/write operation to the distributed shared memories 304 and 904. A user in the first embodiment is equivalent to the CPU 906 of the distributed shared memory controller 903 in the second embodiment. As described above, when receiving an exclusive write command, the CPU 906 on the distributed shared memory card 902 repeatedly retries until it succeeds in the exclusive write, but if 1 is written at the status bit 606 of its register during retry, it ends the retrying and sets data read from the applicable address at the data area 602. Therefore, the prior exclusive write request is cleared and any interrupt to the computer to be caused by this exclusive write request is not generated.

The interface of the distributed shared memory driver 404 and its function are described in the following.

The distributed shared memory driver 404 has the following functions as its interface.
1) Open
2) Close
3) Exclusive write
4) Write
5) Read
6) Initialization routine Also, the memory driver 404 in the second embodiment additionally has the following two functions.
7) Memory content synchronization
8) Lock release Within the framework of the distributed shared memory driver 404, items 3), 4), 5), 7), and 8) are provided as commands of the ioctl interface. Each function of the ioctl interface is described in the following.

In a UNIX system, a device is also accessed as a special file through a file system. 1), Open, and 2), Close, are functions of the ioctl interface prepared for the distributed shared memory driver 404 to perform necessary processes as a device driver with opening and closing of a file, but the distributed shared memory driver 404 does not actually need these functions.

3) Exclusive write, is installed as a command of the ioctl interface. An application program to utilize this function calls it with a file descriptor acquired by an open system call, a command representing an exclusive write, a specified address, and data to be written. As already described, in the first embodiment, this function performs a bus lock and if a value of the specified address is −1, namely, the address is in an unused state, it writes the data and returns 0 representing a normal termination as a return value. On the other hand, if the address is not in an unused state, it returns −1 as a return value. Regardless of success or failure in the exclusive write operation, it stores the original value of the data read from the address into the data area 602 to report the value to the application program.

In the second embodiment, the CPU 906 on the distributed shared memory card 902 repeatedly retries the exclusive write operation until it succeeds, and if it succeeds in the exclusive write, it informed by an interrupt and returns 0 as a return value and −1 as data to the applicable application program (strictly speaking, the exclusive control program in the first and second embodiments). Since UNIX is a multitask operating system, plural application programs can call the same device driver apparently at the same time. Therefore, when an application program sleeps, while waiting for success in an exclusive write of the distributed shared memory card 902, UNIX can perform an exclusive write operation in response to an exclusive write request from another application program.

In this function, the distributed shared memory driver 404 keeps an exclusive write request queue. Exclusive write requests are queued in a queue in the order of being requested. A queued exclusive write request can be executed from a point of time when the command has been issued to the distributed shared memory card to a point of time when their queued time exceeds a timeout value set by the distributed shared memory driver 404. After the time has passed, this function sets 1 at the status bit of the control register of the distributed shared memory card and terminates retry of the exclusive write. At this time, if an exclusive write operation is in the course of execution, data and the like at the time of the termination are kept as an execution context, which is linked to the tall end of the exclusive write request queue. This process is repeated until the exclusive write operations are finished.

In this manner, logic for preventing occupancy of a distributed shared memory card by an exclusive write request is executed not only when queuing a new request, but also inside a subroutine called Callout, which is periodically executed inside the operating system. An application program can also request interruption of an exclusive write operation. An exclusive write can also be interrupted by calling the ioctl interface, for example, through a user's signal handler while setting −1 as data at an address of an exclusive write request already entered. On the other hand, a sleeping exclusive request executes a wakeup operation on the basis of the execution context it has kept. The execution of the exclusive write which is started by the wakeup sets the data read from the queue at the data area of the interface, returns −1 as a return value, and returns to the application program.

The command interfaces for 4), Write, and 5), Read, are common to the above-mentioned embodiments, and a file descriptor, a write or read command, an address on the distributed shared memory, and write data or a free data area for read, are prepared for the ioctl interface.

In a write operation, the distributed shared memory driver 404 sets 1 at the write bit of the register, and sets an address and data. When the write is terminated, it confirms its success by referring to the status bit. So long as the address is not wrong or the bus is not locked by another computer, it succeeds in writing data. Since an address is checked by a subroutine inside the ioctl interface, an error does not occur in the address, but an error caused by a bus lock can occur. In the first embodiment, a retry operation is repeated until it succeeds inside the ioctl interface. In the distributed shared memory card in the second embodiment, it is also possible to notify the system of completion of the write by an interrupt by setting 1 at the status bit, but the distributed shared memory driver 404 carries out a retry operation in the same way as the first embodiment. As a result, it returns 0 as a return value to the application program if it has succeeded in the write to the distributed shared memory and it returns −1 as a return value to the application program if it has failed in the write to the distributed shared memory, including a wrong address.

On the other hand, in a read operation, if only an address is set at the register, data read from its own distributed shared memory is set at the data area of the register. Namely, the distributed shared memory driver 404 stores its value into the data area specified by the ioctl interface and returns 0 as a return value. This register is always accessed as a doubleword (4 bytes). Then, referring to a method of performing termination synchronization while issuing a command to the distributed shared memory card, in all of the embodiments the termination synchronization is performed by preparing sufficient time on the computer side by any method other than notifying the system of the termination by an interrupt, for example, by inserting a no-op instruction.

6), Initialization routine, is an ioctl interface function of the distributed shared memory driver 404 called from the operating system 403 for initialization of the distributed shared memory driver 404 when the operating system 403 starts up. In either embodiment, since it is necessary for all the effective computers to execute the initialization routine and make an adjustment at tile same time, it is assumed that such a network as a LAN 105 can be used as an adjustment means for them. An ordinary initialization routine of a device driver is called early on in the system boot process, but in the embodiments, this is implemented by a method of downloading a driver module after the network becomes usable.

In the first embodiment, a computer having the lowest internet Protocol (IP) address after a timeout period becomes the master, and performs initialization in the above-mentioned manner. After the initialization is finished, the computer notifies the initialization routines of the other computers of completion of the process through an adjustment means. In the second embodiment also, the same adjustment is performed and the distributed shared memory card 902 is started. So long as the distributed shared memory card 902 is not started, the distributed shared memory card 902 continues to maintain an inactive state. As described above, the master computer sets a synchronize command at the register and waits for an interrupt notification from the distributed shared memory card 902. When receiving the interrupt notification, it judges that the process has finished and notifies the other computers of that fact in the same manner as in the first embodiment.

The second embodiment makes it possible for a new computer to participate in a session of the existing distributed shared memories 904 during the session. 7), Memory content synchronization command, of the ioctl interface that is prepared for this, is called from the management demon on the computer requested from a computer which needs to be initialized. The ioctl interface only delivers a-file descriptor. 8), Lock release, is an ioctl interface function which is used for releasing a lock secured by a computer when the computer goes down. This is called by specifying a type of file descriptor lock release command and a machine ID. When being called, this ioctl interface function sets a lock release instruction in the control register of the distributed shared memory card and waits for an interrupt notification. When receiving the interrupt notification, it sets a return value 0 and returns.

(Third embodiment)

A third embodiment of the invention is described in the following. A computer system, and each computer in it to which an exclusive control unit among computers of this embodiment is applied, are respectively composed as shown in FIGS. 1 and 2 in the same way as the first embodiment. The software composition of this embodiment is almost the same as the first embodiment, as shown in FIG. 4. What characterizes this embodiment is the use of a communication program which accesses the operating system 408 through a system call inter face and provides a communication function. The communication program is disposed in the same position as the exclusive control program 402 in FIG. 4 and is run on the CPU 201. Thus not only an exclusive control function but also a communication function can be provided. An ordinary communication function is provided by means of LAN 105, but according to this embodiment, running this communication program makes it possible to utilize the distributed shared memory bus 104 as a communication path in the event that some problem occurs in the LAN 105, and to reduce the load on the LAN 105.

The communication program in this embodiment has such interface functions as Communication path secure, Semaphore operate, and Read/Write.

Communication path secure delivers a key and an area size as arguments, and calls a communication path secure interface function. The key which is a specifier of a communication area and the area size cannot exceed 256 bytes, respectively. When a communication area secure interface function is called, it checks whether or not any area secure function has been performed and attempts to secure a key registration, an area size, a semaphore area, and a communication area, each of which is 1 byte, from areas on the distributed shared memory given in advance according to the system configuration. If it has succeeded in securing the areas, it registers a specified key at the key registration area and sets a specified size in the area size. An exclusive write Function of the distributed shared memory driver is used for this setting. Internally, the fact that a key has been registered means that the area size +3 bytes is in use. The communication area secure interface function is terminated by returning as a return value a communication area ID which becomes an index of data of the communication management program and management information containing an address and size of the secured communication area. If it has failed in the process, it returns −1 representing a failure as a return value. When the communication path secure interface function is called for a key which has already been secured, if a newly specified area size is not greater than the already secured size, it sets the management information and returns the communication area ID in the same way as the first time. It is not permitted for the same computer to perform a communication path secure operation for a key on or after the second time.

The semaphore operation is described in the following.

Semaphore refers to is a lock operation for a communication area. If a computer which writes, namely transmits, information is always the same computer, this operation is not necessary. The Semaphore operation is performed by calling a semaphore secure/semaphore release routine using a communication area ID as an argument. IF it has succeeded in securing a semaphore, it returns 0, and otherwise it returns −1 as a return value. A Factor causing an error is a wrong communication area ID. The semaphore secure operation is internally performed by acquiring some management information from a communication area ID and exclusively writing a machine ID given according to the system configuration into a semaphore area. The semaphore release operation is performed in a such manner that a computer which has secured a communication area writes −1 representing an unused state into a semaphore area. When the semaphore secure/semaphore release operation is finished, it returns 0 and is terminated.

Read/Write is performed by calling the read/write interface function using a communication area ID, an address on the communication area, and data to be written in a write operation, or an address of a 1-byte data area to be read in a read operation, as arguments. The communication program converts a given address to an address on the distributed shared memory and performs a read/write operation by means of a read/write function of the distributed shared memory driver. If it has succeeded in the process, it returns 0 as a return value and if it has failed, it returns −1, and it is terminated. A factor causing a failure is a wrong communication area ID or a wrong address. In this manner, a communication function is provided.

As described above, this embodiment can provide not only an exclusive control function but also a communication function.

(Fourth embodiment)

A fourth embodiment of the invention is described in the Following. A computer system, and each computer in it to which an exclusive control unit among computers of this embodiment is applied, are respectively composed as shown in FIGS. 1 and 2 in the same way as the first embodiment. The software composition of this embodiment is almost the same as the first embodiment as shown in FIG. 4.

What characterizes this embodiment is that the distributed shared memory bus is provided with signal lines for transmitting information with which the respective computers can be identified. This embodiment uses a machine ID as the information with which the respective computers can be identified. This embodiment makes it possible to identify the respective computers by adding signal lines corresponding to machine ID's (hereinafter referred to as machine ID signal lines) of configurable computers to the distributed shared memory bus 104, and provides command interface functions for a specifying read/write operation of a machine ID. It has already been described in the first and second embodiments to perform adjustment among computers by utilizing a network function off a LAN 105 when implementing an initialization routine which is a Function of the ioctl interface of the distributed shared memory driver. By providing the distributed shared memory bus 104 with machine ID signal lines, this embodiment can realize adjustment among computers without using an adjustment means by means of another subsystem of a computer such as an application program using a LAN 105. Namely, the distributed shared memory bus 104 of this embodiment makes it possible for a computer to access the distributed shared memory on another freely selected computer.

Machine ID signal lines corresponding to the greatest number of computers which may be connected with the distributed shared memory bus 104 are prepared. In the embodiment shown in the following, it is assumed that 8 machine ID lines are provided. Therefore, a maximum of 8 computers can be connected.

Operation of this embodiment is described in the following.

When a signal flowing along a machine ID signal line (hereinafter referred to as an ID signal) is asserted, and an R/W signal is negated, the distributed shared memory card of a computer corresponding to the machine ID asserts a BA signal and sends data corresponding to the sent address. When any of the ID signals is asserted, an ordinary transaction is prohibited. Namely, exclusive control is performed.

When an R/W signal is asserted in a write operation, the distributed shared memory card of a computer corresponding to the machine ID asserts a BA signal and attempts to write data on the distributed shared memory bus specified by a DATA signal into an address specified by an ADDR signal on the distributed shared memory bus. At this time, the distributed shared memory card of the destination computer generates an interrupt to its own computer.

In a read operation, the command interface turns on the status bit, sets a machine ID in the data area, and sets an address in the address area, and then executes the read operation. On the other hand, in a write operation, it turns on the status bit, turns on the read/write bit, and writes the machine ID into the control register. After this, it writes an address at which data is to be written in the distributed shared memory, and the data itself, into the register.

Next, the initialization routine of the distributed shared memory driver in this embodiment will be described in the following.

This routine activates the distributed shared memory card by setting the initialize bit as 1. It then reads, one after another, tile beginning addresses of numbers ID0 to ID7, which are respectively assigned to 8 machine ID signal lines, in the distributed shared memory. In this embodiment, since address 0 in the distributed shared memory is used as an area where such management information as the machine ID of its own computer is stored, no application program can use the address 0. If a computer session has been already started, −1 can be read from the distributed shared memory card of the computer. At this time, the distributed shared memory card of a computer having a machine ID which will cause an error in a read operation, is not activated yet. An interrupt is generated to a computer which has started a session. From a Fact that the status bit and the initialize bit are found to be on as a result of reading the register, the interrupt routine of the distributed shared memory driver finds that this interrupt is an interrupt caused by a result of reading a machine ID specification. At this time, if the machine ID is judged to be the smallest machine ID among machine ID's of the distributed shared memory cards which participate in the session, a memory content synchronization process is performed as shown in the second embodiment. After the process has been finished, a machine ID specifying a write operation is performed by writing −1 at address 0 of the distributed shared memory card which has not participated in the session yet. As a result, an interrupt is generated to the computer which has attempted to newly participate in the session and this interrupt wakes up the sleeping initialization routine, and then this initialization routine confirms that −1 is set at address 0 on its own distributed shared memory and terminates the process.

In the case that no computer has been booted up yet, the process is terminated in that condition.

In the case that only one computer has been booted up, the initialization routine sleeps, and in the interrupt routine caused by a specifying read operation of its machine ID, as its own computer is the first computer, the initialization routine performs the same initialization process as the second embodiment. It writes −1 representing an unused state at address 0 in its own distributed shared memory and at address 0 in the distributed shared memories of all computers which have not participated in the session yet, namely, all computers other than its own computer. By doing this, the initialization routine which was sleeping is resumed and terminated.

In this manner, according to this embodiment, since its distributed shared memory bus 104 is provided with machine ID signal lines, it is possible to make an adjustment among the computers without using an adjustment means by means of another computer subsystem such as an application program using a LAN. Values shown as concrete examples in the above-mentioned embodiments, for example, 0 and 1 in the case of using bit data as flags, return values showing whether normal termination occured or not, initial values, and the like are only shown with generally used values, and they are not limited to these values.

The invention makes it possible to perform an exclusive control for a shared resource in a cluster composed of plural computers at a high speed by having each of the computers provided with a distributed shared memory bus for making an exclusive control and a controller for controlling the distributed shared memory bus.

According to the invention, since it will suffice to prepare the same standardized distributed shared memory for each computer, it is possible to easily reduce a system cost. Further, since each distributed shared memory keeps its exclusive control data, even if either of the computers goes down, it is possible for the other computers to continue the exclusive control process.

According to another embodiment of the invention, since a write operation can be performed by a processor connected with each controller, it is possible to reduce a load on a processor of each computer even if a number of write retry operations are repeated due to the impossibility of securing the distributed shared memory bus.

According to another embodiment of the invention, since the distributed shared memory bus is provided with not only an exclusive control function but also a communication function, it possible to utilize the distributed shared memory bus as a communication path even when the network is interrupted.

According to another embodiment of the invention, since the distributed shared memory bus can transmit information with which each of the computers can be identified, it is possible for a computer to access the distributed shared memory on another Freely selected computer through the distributed shared memory bus without using a network.

What is claimed is:

1. An exclusive control unit for performing an exclusive control for a shared resource shared among a plurality of computers, the plurality of computers being connected with one another through a network bus, comprising:

a plurality of distributed shared memories corresponding to the plurality of computers which share the shared resource with one another, each of the distributed shared memories being mounted on one of the computers, a distributed shared memory bus, separate from the network bus, connecting the distributed shared memories with one another so that they may exchange data among them, and a plurality of controllers, each controller being connected to one of the distributed shared memories and to the distributed shared memory bus, for controlling the distributed shared memories and the distributed shared memory bus so that data changes in any one of the distributed shared memories are reflected in each of the distributed shared memories.

2. An exclusive control unit among computers as defined in claim 1, wherein each of the computers includes an I/O bus connecting the computer to the network bus and to a distributed shared memory card, and wherein the distributed shared memory card includes the distributed shared memory and the controller.

3. An exclusive control unit among computers as defined in claim 1, further comprising means for providing a communication function for utilizing the distributed shared memory bus as a communication path by transferring information between computers through the distributed shared memories.

4. An exclusive control unit among computers as defined in claim 1, wherein the distributed shared memory bus has signal lines for transmitting information with which each computer can be identified.

5. An exclusive control unit among computers as defined in claim 1, further comprising a plurality of processors connected to respective controllers, the processors using data in the distributed shared memories to perform exclusive control for the shared resource.

6. An exclusive control unit among computers as defined in claim 5, further comprising means for providing a communication function for utilizing the distributed shared memory bus as a communication path by transferring information between computers through the distributed shared memories.

7. An exclusive control unit among computers as defined in claim 5, wherein the distributed shared memory bus has signal lines for transmitting information with which each computer can be identified.

8. A computer system comprising:

a plurality of computers connected to a network bus to form a network;

a shared resource connected to each of the plurality of computers;

a distributed exclusive control system for the shared resource including:

a plurality of distributed shared memories, each distributed shared memory being connected to one of the computers;

a distributed shared memory bus; and a plurality of controllers, each connected to a respective one of the distributed shared memories and the distributed shared memory bus so that data changes in any one of the distributed shared memories are reflected in each of the distributed shared memories.

9. The computer system of claim 8 wherein each of the computers includes:

a processor; and an I/O bus connected between the processor, the network bus, and a corresponding one of the plurality of controllers.

10. The computer system of claim 9, wherein each computer includes exclusive control means for using data in the distributed shared memories to perform exclusive control for the shared resource.

11. The computer system of claim 10, wherein each exclusive control means includes:

means for reading a data value at a shared memory location to determine whether the shared resource is available;

means for changing a data value at a shared memory location to gain exclusive control of the shared resource; and means for changing a data value at a shared memory location to release exclusive control of the shared resource.

12. The computer system of claim 9, wherein each computer includes means for communicating information to other of the computers through the distributed shared memory bus using data in the distributed shared memories.

* * * * *